United States Patent [19]

Maida

[11] Patent Number: 4,527,882
[45] Date of Patent: Jul. 9, 1985

[54] DISPLAY APPARATUS FOR AUTOMATIC EXPOSURE CONTROL CAMERA

[75] Inventor: Osamu Maida, Tokyo, Japan

[73] Assignee: Nippon Kogaku K.K., Tokyo, Japan

[21] Appl. No.: 665,086

[22] Filed: Oct. 26, 1984

Related U.S. Application Data

[63] Continuation of Ser. No. 438,469, Nov. 2, 1982, abandoned.

[30] Foreign Application Priority Data

Nov. 6, 1981 [JP] Japan .................................. 56-178095
Nov. 6, 1981 [JP] Japan .................................. 56-178096

[51] Int. Cl.³ .............................................. G03B 7/08
[52] U.S. Cl. ..................................... 354/442; 354/475
[58] Field of Search .................... 354/36, 37, 38, 60 E,
354/60 L, 289, 442, 443, 471, 474, 475, 289.1

[56] References Cited

U.S. PATENT DOCUMENTS 4,468,109 8/1984 Maida .................................. 354/442

Primary Examiner—Russell E. Adams
Attorney, Agent, or Firm—Fitzpatrick, Cella, Harper & Scinto

[57] ABSTRACT

Display apparatus for an automatic exposure control camera wherein, when the exposure control mode is automatically changed over from one mode to another, a display is presented to the photographer to indicate the fact of the change over.

5 Claims, 10 Drawing Figures

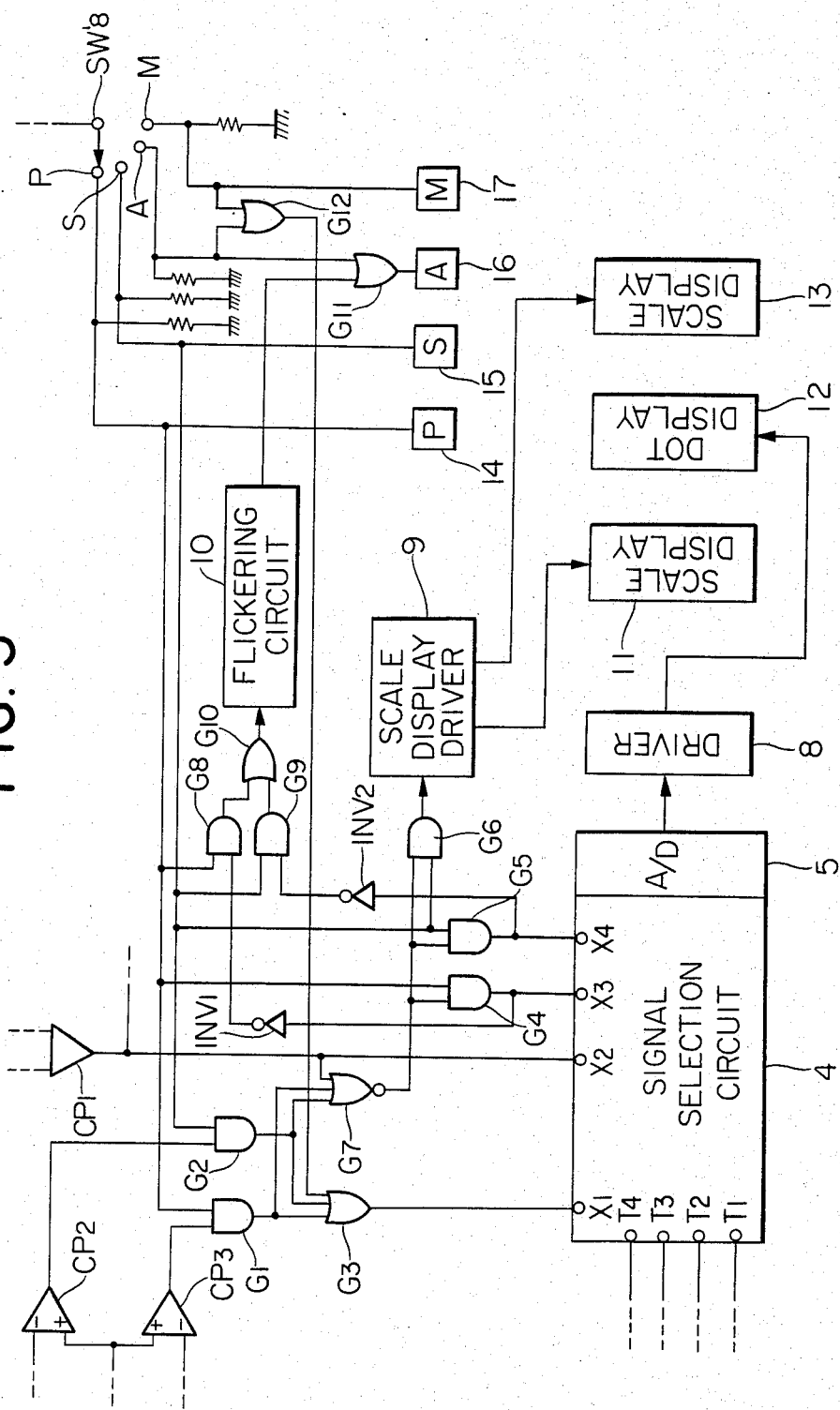

DISPLAY APPARATUS FOR AUTOMATIC EXPOSURE CONTROL CAMERA

This application is a continuation of application Ser. No. 438,469 filed Nov. 2, 1982 now abandoned.

BACKGROUND OF THE INVENTION

1. Field of the Invention

The present invention relates to a display apparatus for an automatic exposure control camera (AE camera).

2. Description of the Prior Art

In the art there are known and used AE cameras in which the element to be controlled in shutter priority AE mode is automatically changed over from lens aperture to shutter speed to broaden the controllable range of exposure when the aperture value necessary for the optimum exposure is out of the range of aperture controllable by automatic control. Also, there are known AE cameras in which, when programmed AE mode is selected, both lens aperture and shutter speed are automatically controlled within the programmed range but only the shutter speed is controlled if the aperture value necessary at that time is out of the controllable range (see U.S. Pat. No. 4,204,755). In either case, the mode automatically changed over to in this particular state is different from that which the operator has intentionally selected. Therefore, it is desired that such automatic change-over, if made, be indicated to the operator in clearly visible display form. Otherwise it may lead the photographer to misunderstanding of the exposure control mode at taking. As a result, the photographer may fail to take good pictures or to catch good shutter chance.

SUMMARY OF THE INVENTION

Accordingly, the object of the present invention is to provide a camera in which, when the exposure control mode is changed over automatically from the mode intended by the photographer to another mode, it is made known to the photographer in clearly visible display form.

According to the invention, there is provided a display apparatus for use in a camera in which the aperture can be controlled within a predetermined control range based on the shutter speed preset to obtain an optimum exposure, comprising; control means for setting the aperture to a determined aperture value and controlling the shutter speed based on the determined aperture value if the aperture value for optimum exposure based on said preset shutter speed is out of the control range, detection means for determining whether or not the aperture value for optimum exposure is within the control range and generating a detection signal according to the result, selection means for generating two different signals selectively according to the detection signal, one of which two different signals is an aperture signal indicative of the aperture value for optimum exposure and is generated only when the aperture value for optimum exposure is within the determined range, and the other signal is a shutter speed signal indicative of the controlled shutter speed and generated when the aperture value for optimum exposure is not within said range, and display means for making a display of the aperture value for optimum exposure when the aperture signal is introduced thereto and making a display of the controlled shutter speed value when the shutter speed signal is introduced thereto.

Other and further objects, features and advantages of the invention will appear more fully from the description taken in connection with the accompanying drawings.

BRIEF DESCRIPTION OF THE DRAWINGS

FIG. 3 is a circuit diagram showing another embodiment; and

DETAILED DESCRIPTION OF THE PREFERRED EMBODIMENTS

Figure 1:
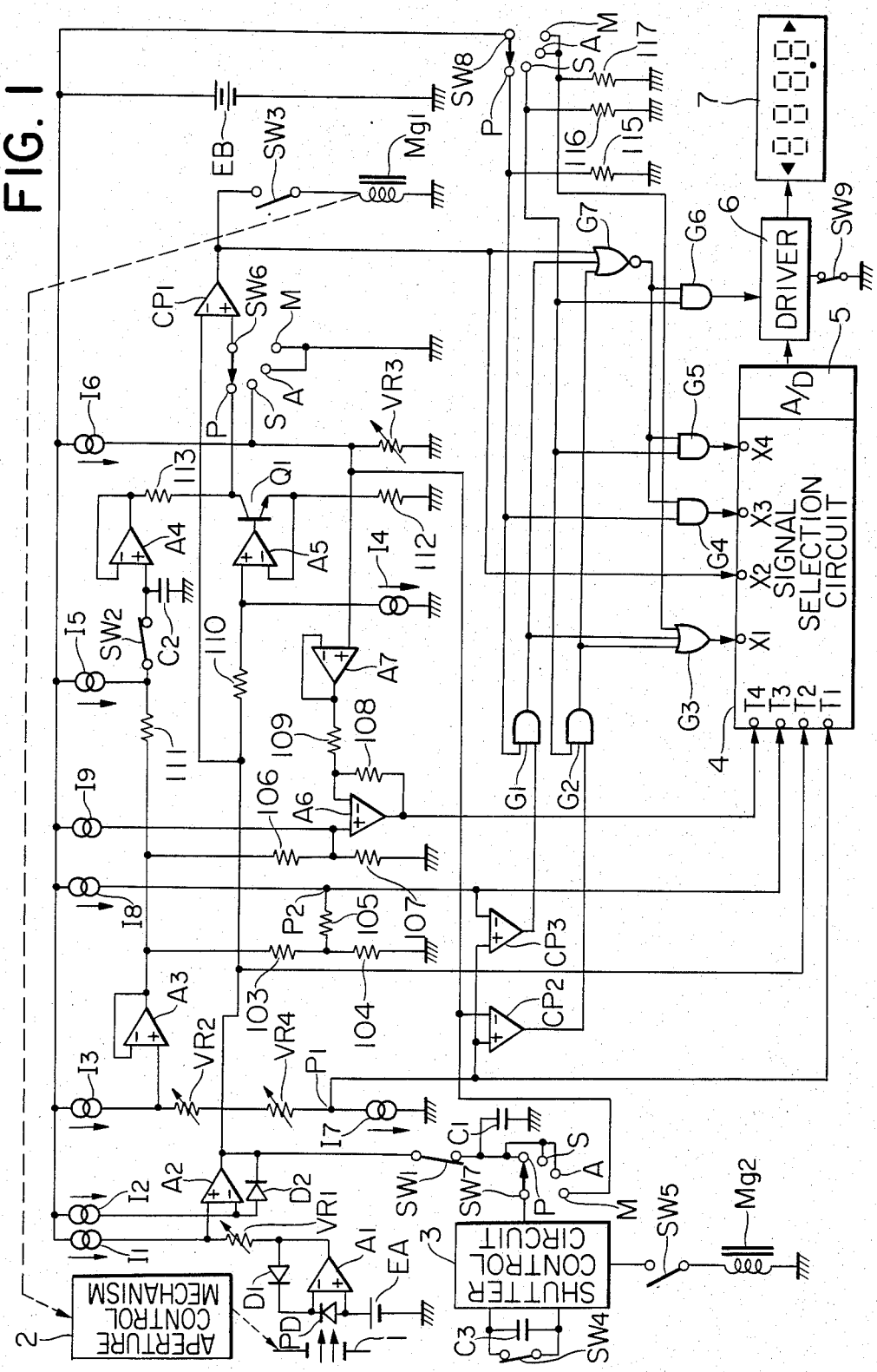
FIG. 1 is a circuit diagram showing an embodiment of the invention.

Referring first to FIG. 1 there is shown a circuit diagram of an embodiment of the invention.

In FIG. 1, a diaphragm of a taking lens is designated by 1. The opening of the diaphragm 1 is controlled by an aperture (diaphragm) control mechanism 2. Photo diode PD, operational amplifier A1 and logarithmic compression diode D1 constitute together a metering circuit. The positive input terminal of the operational amplifier A1 is biased by a reference voltage source AE the voltage of which is proportional to absolute temperature. VR1 is a variable resistor whose resistance value corresponds to the film sensitivity set by a film sensitivity setting dial (not shown). I1 is a constant current source which supplies to the variable resistor VR1 a current proportional to absolute temperature to change the terminal voltage of VR1 in proportion to absolute temperature. The terminal voltage of VR1 is applied to the positive input terminal of operational amplifier A2. A temperature compensating diode D2 is connected to the negative feedback loop of the operational amplifier A2. A current having no temperature characteristic is supplied to the diode D2 from a constant current source I2. These elements A2, D2 and I2 function to cancel the temperature characteristic of the counter saturation current of the logarithmic compression diode D1.

The output voltage of the operational amplifier A2 is applied to a first memory condenser C1 through a first memory switch SW1. The output voltage is level-shifted by a voltage shift resistor 110 and a constant current absorption source I4. The first memory switch SW1 is interlocked, for example, with a quick-return mirror in such a manner that the switch is closed when the light from the object normally enters the photo diode PD (at mirror-down) and is opened immediately before the normal incidence of the object on the photo diode is blocked off (at mirror-up).

VR2 is a variable resistor whose resistance value corresponds to the maximum aperture of the taking lens. The taking lens may be a lens fixed to the camera body or an exchangeable lens (in the latter case, the maximum aperture is variable according to the lens then mounted to the camera). A constant current source I3 supplies to the variable resistor VR2 a current proportional to absolute temperature. Thereby the sum of the output voltage of A2 and the voltage corresponding to the maximum aperture is applied to the positive input terminal of a follower amplifier A3. To the output voltage of A3 is added a voltage determined by a voltage adding resistor 111 and a constant current source I5. The added voltage is applied to a second memory condenser C2 through a second memory switch SW2. The voltage of the second condenser C2 is put out from a follower amplifier A4 after impedance conversion.

Operational amplifier A5, transistor Q1 and resistors 112, 113 constitute together a subtraction circuit which subtracts the voltage depending on A2 (voltage at the connection point of resistor 110 and constant current source I5) from the voltage depending on the output of A3 (output voltage from A4). The voltage resulting from the subtraction (this voltage is referred to hereinafter as program signal voltage) is applied to the connection point of resistor R13 and transistor Q1.

VR3 is a variable resistor whose resistance value varies depending on the shutter speed manually set. To this end, the variable resistor VR3 is interlocked with a manual operation member such as a shutter speed setting dial on the camera. A constant current circuit I6 supplies to VR3 a current proportional to absolute temperature. The voltage appearing at the terminal of the variable resistor VR3 at the time is referred to hereinafter as manual shutter time signal voltage.

SW6 is a first mode selection switch which can select any one terminal among P, S, A and M. Terminal P is selected for programmed exposure control mode, S for shutter priority exposure control mode, A for aperture priority exposure control mode and M for manual shutter speed mode. The above-mentioned program signal voltage is applied to the terminal P, and the manual shutter speed signal voltage is applied to the terminal S. The remaining two terminals A and M are grounded. A second mode selection switch SW7 is interlocked with the first mode selection switch SW6 to select any one terminal among P, S, A and M in the same manner as above in accordance with the mode selection made by the first switch SW6. Terminals P, S and A of the switch SW7 are connected to the first memory condenser C1. To the terminal M there is being applied the manual shutter speed signal voltage (the terminal voltage of VR3).

Comparator CP1 makes a comparison between the output voltage of the operational amplifier A2 applied to its inversion input terminal and the voltage applied to its non-inversion input terminal from the terminal selected by the first mode selection switch SW6. According to the result of the comparison the comparator CP1 produces high level output or low level output to energize or deenergize a diaphragm control magnet Mg1 through switch SW3. For convenience' sake of explanation, high level and low level will be referred to hereinafter as "H" and "L" briefly.

3 is a shutter control circuit which controls shutter speed when terminal P, S or A is selected by the second mode selection switch SW7. The shutter control circuit 3 carries out the control of shutter in accordance with the voltage level on the first memory condenser C1 existing at the time of the first memory switch SW1 being opened by mirror-up after the diaphragm 1 has already set to a determined aperture. More concretely, in response to the start of running of the shutter opening curtain, a trigger switch SW4 is opened and an integrating condenser C3 starts the integration of voltage. When the integrated voltage reaches a determined relation to the voltage of the first memory condenser C1, a shutter control magnet Mg2 is excited through a shutter control switch SW5 to allow the shutter closing curtain to start running to terminate the exposure.

The shutter control circuit 3 including condensers C1, C2 etc. may be formed of an analog or digital circuit known per se. The above-mentioned shutter control switch SW5 is closed and opened in opposite phase to the first memory switch SW1 thereby blocking the current to the magnet Mg2 except the time during the control of the shutter curtain. The diaphragm control switch SW3 remains closed during the time from the opening of SW2 to the closing SW5. It remains opened during the time of from the closing of SW5 to the opening of SW2.

The above description relates to the circuit part for exposure control. Now, the circuit part relating to display of exposure will be described in detail.

A serial circuit of variable resistor VR4 and constant absorption current source I7 is connected to the output terminal of operational amplifier A2. The variable resistor VR4 is interlocked with a lens aperture preset ring. The constant current source I7 applies to VR4 a flow of absorption current proportional to absolute temperature. The resistance value of VR4 changes in proportion to the existing difference in diaphragm step between the maximum lens aperture and the preset aperture value. Therefore, the voltage appearing at the connection point P1 corresponds to the value as given by subtracting the terminal voltage of VR4 from the output voltage of A2. The voltage appeared at P1 is applied to a first terminal T1 of signal selection circuit 4. The output voltage of A2 is applied to a second terminal T2 of the circuit 4.

The output voltage of follower amplifier A3 is divided by resistors R3 and R4 and also level-shifted to a determined level by constant current source I8 and resistor R5. The voltage appearing at connection point P2 corresponds to the value as given by multiplying the output voltage of A3 by a factor determined by resistors 103 to 105 and the current from constant current source I8. The voltage appearing at P2 is applied to a third terminal of the signal selection circuit 4.

Resistors 106 to 109 having the same resistance value, a constant current source I9 for generating a current proportional to absolute temperature and an operational amplifier A6 constitute together a differential amplifier circuit. The differential amplifier circuit produces an output voltage by subtracting the output voltage of A7 from the output voltage of A3. The output voltage of the follower amplifier A7 is the manual shutter speed signal voltage after impedance conversion. The output of the operational amplifier A6 is applied to a fourth terminal T4 of the signal selection circuit 4.

SW8 is a third mode selection switch which is also interlocked with the switch SW6 and selects any one terminal among P, S, A and M in the same manner as above in accordance with the mode selected by SW6. Comparator CP2 makes a comparison between the voltage at P1 and the manual shutter speed signal voltage. AND gate G1 has two inputs for receiving the output from the comparator CP3 and the output from the terminal P of the switch SW8. Similarly AND gate G2 receives the output from CP2 and the output from the terminal S of SW8. OR gate G3 has three inputs for receiving the outputs from G1 and G2 and the output from the terminal A or M of the switch SW8. The output of OR gate G3 is applied to a terminal X1 of the signal selection circuit 4. The output of comparator CP1 is applied to another terminal X2 of the selection circuit 4. NOR gate G7 has three inputs for receiving the outputs from G1, G2 and CP1. AND gate G4 receives the outputs from terminal P of SW8 and from G7 and applies its output to terminal X3 of the selection circuit 4. Similarly AND gate G5 receives the output from the terminal S of SW8 and from G7 and applies its output to terminal X4 of the selection circuit 4.

The signal selection circuit 4 is composed of logic circuit comprising AND gates etc. in such manner as to transmit the input voltages selectively to an A/D converter 5 according to the following relationship.

When the terminal X1 is "H", the input voltage applied to the terminal T1 is transmitted to A/D converter 5; when the terminal X2 is "H", the input voltage applied to the terminal T2 is transmitted to the converter; when X3 is "H", the input voltage to T3 is transmitted to the converter, and when X4 is "H", the input voltage applied to terminal T4 is transmitted to the A/D converter 5. The A/D converter carries out sampling of input voltages at a determined period and its digital signal output is applied to a driver 6 to drive a display unit 7. The display unit 7 comprises a plural number of segment display elements which are selectively driven to make various displays as will be described in detail later. The exposure display mode of the display unit 7 is changed over from one to another by the output from AND gate G6 which are receiving the output from the terminal S of the switch SW8 and the output from NOR gate G7. When the output of AND gate G6 is "H", the driver 6 drives the display unit 7 to make a display of aperture value. On the contrary, when the output of G6 is "L", the driver drives the display unit to make a display of shutter speed. The timing of mode change-over between aperture value display and shutter speed display is in synchronism with the sampling period of the A/D converter 5. SW9 is a latch switch which is opened interlocking with the shutter releasing motion and is closed at the completion of exposure. At the closing of SW9 the driver 6 latches or erases the display on the display unit 7. A certain determined time (mirror bound attenuation time at mirror-down) after the closing of SW9, the drivers refreshes the display. EB is a power source for the circuit system.

The manner of operation of the above embodiment will be described in detail hereinafter. In the following description, exposure factors such as aperture value and shutter speed will be expressed in Apex denomination.

[1] Programmed exposure control mode

In this mode, the first to third mode selection switches SW6-SW8 are in the position to select their terminal P.

The exposure control operation and display operation in this mode are as follows:

(1) Light measuring operation prior to shutter release:

The lens diaphragm 1 is fully opened to give the maximum aperture (minimum F-number) of the lens. LET AV0 be the maximum aperture value, BV the brightness of the object and SV the film sensitiveness. Then, the output voltage of the operational amplifier A2, VA2 is given by:

$$VA2 = E1 + \alpha\{(BV - AV0) + SV\} = VTVA0 \qquad (1)$$

wherein, E1 is a constant voltage containing the voltage E0 of the reference voltage source EA and independent of Apex values and $\alpha$ is a factor used for the conversion of Apex value to voltage.

Therefore, the output voltage of the follower amplifier A3, VA3 is:

$$VA3 = E1 + \alpha\{(BV - AV0) + SV - AV0\} \qquad (2)$$

$$= E1 + \alpha(BV + SV)$$

After adding a constant voltage E2 determined by resistor 111 and constant current source 15, the voltage VA3 is applied to the second memory condenser C2. Consequently, the output of follower amplifier A4, VA4 becomes:

$$VA4 = E1 + E2 + \alpha(BV + SV) \qquad (3)$$

On the other hand, since the output of the operational amplifier A2 is given by the above equation (1), the input voltage VA8in to the non-inversion input terminal of operational amplifier A5 is:

$$VA8in = E1 - E3 + \alpha\{(BV - AV0) + SV\} \qquad (4)$$

wherein, E3 is a constant voltage determined by resistor 110 and the absorption current of the constant absorption, current source I4.

Let the resistance values of resistors 112 and 113 be R12 and R13. Then, assuming that the transistor Q1 is sufficiently high in hFE, the collector voltage of the transistor Q1, that is, the program signal voltage VQ1 is given by:

$$VQ1 = VA4 - \frac{R13}{R12} \cdot VA8in$$

From (3) and (4), $$VQ1 = E1 + E2 + \alpha(BV + SV) - \beta[E1 - E3 + \qquad (5)$$

$$\alpha\{(BV - AV0) + SV\}]$$

$$= (1 - \beta)E1 + E2 + \beta E3 + \alpha(1 - \beta)(BV + SV) + \alpha\beta AV0$$

wherein, $$\beta = \frac{R13}{R12}$$

(2) Operation of programmed exposure control after shutter release:

With the start of shutter releasing operation, the lens aperture is stopped down by the diaphragm 1 and at the same time the diaphragm control switch SW3 is closed while the second memory switch SW2 is opened. Assuming that VA2>VQ1 at the time, the output voltage of the operational amplifier A2 according to the stop-down of the aperture becomes:

$$VA2 = E1 + \alpha\{(BV - AV) + SV\} \qquad (5)'$$

wherein, AV generally denotes the aperture values existing at different time points in the course of aperture stop-down.

The process signal voltage becomes:

$$VQ1 = (1 - \beta)E1 + E2 + \beta E3 + \alpha(1 - \beta)(BV + SV) + \alpha\beta AV \qquad (6)$$

Finally, the lens aperture is stopped down to the state of VA2=VQ1. At this time point, the output of the comparator CP1 becomes "H" by which the magnet Mg1 is actuated through switch SW3 to block any further stop-down of the aperture. The aperture value AVp obtained at this time point is, as seen from a simple consideration, given by:

$$AVp = \frac{\beta}{1+\beta}(BV + SV) + \frac{\beta(E1 - E3) - E2}{\alpha(1+\beta)} \quad (7)$$

In the formula (7), the term of $$\frac{\beta}{1+\beta}$$

represents the changing rate of the aperture value AVp to the object brightness BV.

$$\frac{\beta(E1 - E3) - E2}{\alpha(1+\beta)}$$

is the level shift term representing the required level shift to obtain the aperture value AVp for the given value of BV.

After the aperture value has been set by the diaphragm 1 in this manner, the first memory switch SW1 is opened and SW5 is closed interlocking with mirror-up. Therefore, in the first memory condenser C1 there is stored the output voltage of A2 after the setting of the aperture value, which is:

$$VA2 = E1 + \alpha\{(BV - AVp) + SV\} = VTVP \quad (8)$$

The shutter control circuit 3 applies a current to the magnet Mg2 through SW5 to lock the shutter closing curtain against running. Thereafter, the shutter opening curtain starts running by an operation interlocked with the motion of mirror-up. At the same time the trigger switch SW4 is opened. When there is obtained a determined relation in voltage between condensers C1 and C3, the control circuit 3 cuts off the current to the magnet Mg2 to allow the shutter closing curtain to start running. Thus, the control of shutter speed is completed. The shutter speed TVp obtained at this time is, from (8), given by:

$$TVp = BV + SV - AVp \quad (9)$$

Using the above (7) and (9), TVp can be represented by:

$$TVp = \frac{1}{1+\beta}(BV + SV) - \frac{\beta(E1 - E3) - E2}{\alpha(1+\beta)} \quad (10)$$

In the above formula (10), the term of $$\frac{1}{1+\beta}$$

represents the changing rate of shutter speed TVp to the object brightness BV and the term of $$\frac{\beta(E1 - E3) - E2}{\alpha(1+\beta)}$$

represents the level shift required to attain the shutter speed TVp for the given value of BV. As readily understood from (7) and (9), $$0 < \frac{\beta}{1+\beta} < 1$$

for $0 < \beta$ and therefore it is possible to suitably determine the share of AVp and the share of TVp for the given value of object brightness.

If $\beta = 1$, then the program signal voltage will become: $VQ1 = E2 + E3 + \alpha AV0$ before the shutter releasing operation and $VQ1 = E2 + E3 + \alpha AV$ after the operation. Thus, the voltage VQ1 before shutter releasing operation is a fixed voltage independent of the brightness of the object. VQ1 after the shutter releasing operation is a voltage corresponding solely to the change of the aperture value in the course of aperture stop-down. AVp and TVp at the time are:

$$AVp = \tfrac{1}{2}(BV + SV) + \frac{E1 - E3 - E2}{2\alpha} \text{ and}$$

$$TVp = \tfrac{1}{2}(BV + SV) - \frac{E1 - E3 - E2}{2\alpha}$$

The operation described above relates to the case where the lens aperture is controlled within the range of $AV0 < AVp < AVM$ wherein AVM is an aperture value corresponding to the minimum controllable aperture preset by use of the preset diaphragm ring of the lens.

However, as will be understood from the above equation (6), there is the possibility of such an object brightness (or combination of brightness and film sensitiveness) for which any optimum exposure can not be obtained unless the aperture is controlled in the range of $AVp < AV0$ or $AVM < AVp$. But, for these two ranges it is practically impossible to control the aperture further to a larger or smaller aperture side. In these cases, therefore, the exposure must be controlled in different manner from the above. The manner of operation will be described hereinafter. For $AVp < AV0$:

In this case, the output of comparator CP1 is already "H" before releasing the shutter because of $VA2 < VQ1$. Therefore, simultaneously with the closing of switch SW3 in response to the shutter releasing operation, a current is supplied to the magnet Mg1 to prevent stopping-down of the aperture. Consequently there is stored in the first memory condenser C1 such an output voltage of the operational amplifier A2 which is produced when the object light is measured through the open aperture as expressed by the above equation (1). The shutter speed TVA0 determined at the time is:

$$TVA0 = BV - AV0 + SV \quad (11)$$

For $AVM < AVp$:

In this case, the output of the comparator CP1 continues to be "L" even after the aperture has been stopped down to the aperture value AVM corresponding to the minimum aperture controllable by the diaphragm 1. Therefore the first memory switch SW1 is opened after the longest stop-down time. At the time there is stored in the first memory condenser C1 such an output voltage of the operational amplifier A2 which is produced when the object light is measured through the minimum aperture. The output of A2 is: $VA2 = E1 + \alpha\{(BV - AVM) + SV\}$. The shutter speed TVAM determined at the time is:

$$TVAM = BV - AVM + SV \quad (12)$$

(3) Display operation before shutter release:

For convenience' sake let D denote Apex value of the aperture value or shutter speed to be displayed on the display unit 7 and let VT denote generally the input voltage to terminal T1-T4. Then, $$VT = E1 + \alpha D \qquad (13)$$

Let VTVP denote the voltage at the connection point P2 and R3, R4, and R5 denote the resistance values of the resistors 103, 104 and 105 respectively. Then, $$VTVP = \{E1 + \alpha(BV + SV)\}\frac{R4}{R3 + R4} + \qquad (14)$$

$$i8\left\{R5 + R4\left(1 - \frac{R4}{R3 + R4}\right)\right\}$$

$$= \alpha \cdot \frac{1}{1 + \gamma}(BV + SV) + \frac{1}{1 + \gamma}E1 +$$

$$i8\left\{R5 + R4\left(1 - \frac{1}{1 + \gamma}\right)\right\}$$

wherein, $$\gamma = \frac{R3}{R4}$$

and i8 is the current of the constant current source I8. From (13) and (14), the Apex value D is:

$$D = \frac{1}{1 + \gamma}(BV + SV) + \qquad (15)$$

$$\frac{1}{\alpha}\left[i8\left\{R5 + R4\left(1 - \frac{1}{1 + \gamma}\right)\right\} - \frac{\gamma}{1 + \gamma}E1\right]$$

In order to attain the coincidence of the actually determined shutter speed to the Apex value D it is necessary to make (15) equal to (10). To this end i.e. to attain $$\frac{1}{1 + \gamma}(BV + SV) +$$

$$\frac{1}{\alpha}\left[i8\left\{R5 + R4\left(1 - \frac{1}{1 + \gamma}\right)\right\} - \frac{\gamma}{1 + \gamma}E1\right] \equiv$$

$$\frac{1}{1 + \beta}(BV + SV) - \frac{\beta(E1 - E3) - E2}{\alpha(1 + \beta)},$$

the current i8 and resistors 103-105 are so set as to satisfy the following conditions:

$$\begin{cases} \gamma = \beta \\ i8\left\{R5 + R4\left(1 - \frac{1}{1 + \gamma}\right)\right\} = \frac{E2 + \beta E3}{1 + \beta} \end{cases}$$

After all, (15) becomes:

$$D = \frac{1}{1 + \beta}(BV + SV) - \frac{\beta(E1 - E3) - E2}{\alpha(1 + \beta)} = TVp$$

which is equal to (10). Therefore, the voltage at P2 becomes equal to the shutter speed TVp for AVO<AVp<AVM.

On the other hand, let the voltage at P1 be VTVAM. Then, since in programmed exposure control mode the preset diaphragm ring is set to the minimum aperture, $$VTVAM = E1 + \alpha\{(BV - AVO) + SV - (AVM - AVO)\} \qquad (16)$$

wherein, AVM is the aperture value of the minimum aperture presettable by the presetting diaphragm ring of the lens.

Using the general formula (13) for voltage-Apex value conversion, (16) can be expressed by the following formula:

$$D = BV + SV - AVM = TVAM \qquad (17)$$

The Apex value D corresponds to the shutter speed which can provide an optimum exposure to the preset value AVM when the aperture is stopped down to the preset aperture value. In the case where the aperture value preset by the presetting diaphragm ring is not for the minimum aperture but for another aperture value AVpreset, the above equation (17) can be represented by:

$$D = BV + SV - AVpreset = TVpreset \qquad (18)$$

As the output of the operational amplifier A2, VTVA0 is given by the above (1), considering (13) the shutter speed which can provide an optimum exposure to the value of the maximum (open) lens aperture AV0 is also given by:

$$D = BV + SV - AV0 = TVA0 \qquad (19)$$

Under the condition of AV0<AVp<AVM, AVp<AV0 or AVp>AVM the following display operation is carried out in the apparatus:

AV0<AVp<AVM

Under this condition, the output of the comparator CP1 is "L" for the reason described above. Since AVp<AVM, from (9) TVp>BV+SV−AVM. Therefore, from (8) and (16) VTVP>VTVAM. Consequently the output of the comparator CP3 is "L". In this state, gates operate as shown in the following table, Table-1.

TABLE 1

| CP1 | CP2 | CP3 | G1 | G2 | G3 | G7 | G4 | G5 | G6 |
|---|---|---|---|---|---|---|---|---|---|
| L | * | L | L | L | L | H | H | L | L |

* this logical value may be "H" or "L".

Figure 2A:
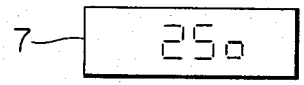
FIGS. 2a to 2d show examples of display made by the display apparatus and appearing in the finder.

Therefore, the signal selection circuit 4 has "H" at its terminal X3 only, and transmits to A/D converter 5 the input voltage to terminal T3, that is, the voltage VTVP of the above formula (14). Because the output of AND gate G6 is "L", the driver 6 drives the display unit 7 to make a display of the shutter speed corresponding to the voltage VTVP. For example, as shown in FIG. 2a, there is displayed "250" which means a shutter speed of 1/250 sec.

Avp<AV0

Under this condition, the output of the comparator CP1 is already "H". Since AVp<AV0<AVM, the output of the comparator CP2 is "L". In this state, gates are operating as shown in the following table, Table-2.

TABLE 2

| CP1 | CP2 | CP3 | G1 | G2 | G3 | G7 | G4 | G5 | G6 |
|---|---|---|---|---|---|---|---|---|---|
| H | L | * | L | L | L | L | L | L | L |

Therefore, the circuit 4 has "H" at its terminal X2 only, and transmits to A/D converter 5 the input voltage to the terminal T2, that is, the voltage VTVAO of the formula (1). As the output of AND gate G6 is "H", the driver 6 drives the display unit 7 to make a display of the shutter speed corresponding to the voltage VTVA0.

AVp>AVM

Under this condition, the output of CP1 is "L". Also, since AVp>AVM, from (9) TVp<BV+SV−AVM=TVAM. Therefore, the output of CP3 is "H". In this state, gates are operating as shown in the following table, Table-3.

TABLE 3

| CP1 | CP2 | CP3 | G1 | G2 | G3 | G7 | G4 | G5 | G6 |
|---|---|---|---|---|---|---|---|---|---|
| L | * | H | H | L | H | L | L | L | L |

Accordingly, the circuit 4 has "H" at its terminal X1 only, and transmits to A/D converter 5 the input voltage VTVAM applied to its terminal T1. The display unit 7 makes a display of the shutter speed TVAM corresponding to the input voltage VTVAM.

[2] Shutter priority exposure control mode

In this mode, the first to third mode selection switches SW6–SW8 are in the position to select the terminal S.

(1) Operation before shutter release:

Operational amplifier A2 is applying to the inversion input terminal of comparator CP1 a voltage according to the formula (1). Assuming that the aperture value preset by the preset diaphragm ring is AVM, the voltage VTVM now being applied to the non-inversion input terminal of CP1 (that is the terminal voltage of the variable resistor VR3) is:

$$VTVM = E1 + \alpha TVM \quad (20)$$

wherein, TVM is the shutter speed manually set at that time.

(2) Operation for exposure control:

With the releasing of the shutter, the diaphragm 1 starts to stop down the lens aperture. The output VA2 of the operational amplifier A2 changes according to the formula (5)'. At the time point VTAM=VA2, the comparator CP1 produces an output "H" by which the aperture stopping-down motion is stopped. The aperture value set at this time point is:

$$AVS = BV + SV - TVM \quad (21)$$

Thereafter, the first memory switch SW1 is opened and the condenser C1 stores therein the output of A2 existing at that time i.e. $E1+\alpha\{(BV-AVs)+SV\}$. Thereby, the actually controlled shutter speed TVs becomes:

$$TVs = BV - AVs + SV = TVM$$

Since, as previously noted, the aperture value of the lens controllable in practice has a limit, the above manner of operation for exposure control applies to the case of AV0<AVs<AVM. In case of AVs<AV0 or AV<AVs, the exposure control is carried out in the following manner:

AVs<AV0

Under this condition, the output of the comparator CP1 has already been "H" before releasing the shutter and therefore the diaphragm is kept at the position for the full-open lens aperture, that is, aperture value AV0. Accordingly, in the first memory condenser C1 there is stored the voltage represented by (1). The actually determined shutter speed TVA0 at the time is given by (11). Thus, the shutter speed is changed from TVM to TVA0 in this case.

AVM<AVs

Under this condition, the output of the comparator CP1 continues to be "L" even after the completion of aperture stop-down operation. Therefore, in the first memory condenser C1 there is stored the output of the operational amplifier A2, that is, $E1+\alpha\{(B-V-AVM)+SV\}$. Accordingly, the shutter speed TVAM then determined is given by (12). In this case also, the shutter speed is changed from TVM to TVAM.

(3) Operation for display before shutter release:

AV0<AVs<AVM

Under the condition, the output of CP1 is "L". For AVs<AVM, there is established the relation of TVM>BV+SV=AVM. Therefore, from (16) and (20), VTVM>VTVAM. Consequently, the output of CP2 is "L". In this state, gates are operating as shown in the following table, Table-4.

TABLE 4

| CP1 | CP2 | CP3 | G1 | G2 | G3 | G7 | G4 | G5 | G6 |
|---|---|---|---|---|---|---|---|---|---|
| L | L | * | L | L | L | H | L | H | H |

* this logical value may be "H" or "L".

Therefore, the circuit 4 has "H" at its terminal X4 only, and transmits to A/D converter 5 the input voltage applied to the terminal T4. The input voltage VAVs applied to the terminal T4 is:

$$VAVs = E1 + \alpha(BV + SV - TVM) \quad (22)$$
$$= E1 + \alpha AVs$$

Figure 2B:
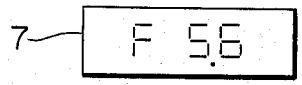

In other words, when the resistors 106–109 have the same resistance value and the resistance value R7 of the resistor 107 is so set as to hold the relation of i9R7=E1, the operational amplifier A6 produces the output voltage VAVs of the above formula (22). From (13) and (22) it is seen that the voltage VAVs corresponds to the aperture value AVs. As the output of AND gate G6 is "H", the driver 6 drives the display unit 7 to make a display of the aperture value AVs. For example, as shown in FIG. 2b, there is displayed "F 5.6" which is the aperture value in F-number actually determined by the automatic exposure control.

AVs<AV0

Under this condition, the output of the comparator CP1 has already been "H" before releasing the shutter. Because of AVs<AV0<AVM, the output of CP2 is "L" like the above case. Gates are operating as shown in the following table, Table-5.

TABLE 5

| CP1 | CP2 | CP3 | G1 | G2 | G3 | G7 | G4 | G5 | G6 |
|---|---|---|---|---|---|---|---|---|---|
| H | L | * | L | L | L | L | L | L | L |

Therefore, the signal selection circuit 4 has "H" at its terminal X2, and transmits to A/D converter 5 the input voltage applied to terminal T2, that is, the voltage of the above formula (1). Since the output of AND gate G6 is "L", the driver 6 drives the display unit to make a display of the shutter speed TVA0 as given by the equation (11).

AVM<AVs

Under this condition, the output of CP1 is "L" and that of CP2 is "H" because of AVM<AVs and VTVM<VTVAM. Gates are operating as shown in the following table.

| CP1 | CP2 | CP3 | G1 | G2 | G3 | G7 | G4 | G5 | G6 |
|---|---|---|---|---|---|---|---|---|---|
| L | H | * | L | H | H | L | L | L | L |

Therefore, the circuit 4 has "H" at its terminal X1, and transmits to A/D converter 5 the input voltage to terminal T1, that is, the voltage VTVAM according to the formula (16). The display unit 7 makes a display of the shutter speed TVAM corresponding to the input voltage VTVAM.

[3] Diaphragm priority exposure control mode

In this mode, the first to third mode selection switches SW6–SW8 are in the position to select terminal A. The non-inversion input terminal of the comparator CP1 is connected to ground and therefore the output of CP1 is always "L" in this mode. Accordingly, no operation takes place for blocking the stop-down of the aperture.

The photographer sets the presetting diaphragm ring to any desired aperture value AVpreset and then releases the shutter. The aperture is at first stopped down to the preset value AVpreset. Thereafter, the first memory switch SW1 is opened, and in the condenser C1 there is stored the output voltage of the operational amplifier at the time, that is VTVpreset=E1-+α{(BV+SV)−AVpreset}. Therefore, the shutter speed TVpreset is controlled to a value as given by the formula (18).

The manner of operation for display of the determined shutter speed is as follows.

In this case, the output of CP1 is fixed at "L". Also, the outputs of AND gates G1 and G2 are fixed at "L" independently of the outputs of CP2 and CP3. Furthermore, the output of AND gate G5 is fixed at "L". Therefore, only the output of OR gate G3 is "H". The circuit 4 has "H" at its terminal X1, and transmits to A/D converter 5 the input voltage VTVpreset to terminal T1. Thus, the display unit 7 makes a display of the determined shutter speed TVpreset.

[4] Manual shutter speed mode

In this mode, the first to third mode selection switches SW6–SW8 are in the position to select terminal M. The output of CP1 is fixed at "L". Therefore, the aperture is stopped down to the preset aperture value AVpreset and the shutter speed is controlled to TVM.

In this state, gates are operating in the same manner as in the above diaphragm priority exposure control mode. Therefore, voltage VTVM is applied to the terminal T1 of the circuit 4 and the shutter speed TVM corresponding to the input voltage is displayed.

Figure 2C:
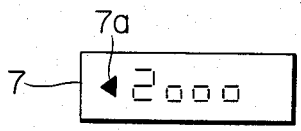
Figure 2D:
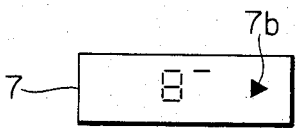

In all of the above described exposure control modes, there is made also a display indicating whether the determined shutter speed is within the limits of exposure control, in addition to the above display of the determined shutter speed by exposure control. Examples of such limit display are shown in FIGS. 2c and 2d. When the shutter speed output from A/D converter 5 exceeds the upper limit of control range, the driver 6 drives the display unit 7 to make a display of its as shown in FIG. 2c wherein "2000" indicates that the upper limit is 1/2000 sec. and the mark 7a indicates that the determined shutter speed is over the limit. If the shutter speed exceeds the lower limit, this is displayed as shown in FIG. 2d wherein the numerical symbol is indicating that the lower limit of exposure control is 8 sec. and the mark 7b is indicating that the determined shutter speed is under the lower limit.

A second embodiment of the invention is shown in FIG. 3 wherein like reference characters to FIG. 1 represent the same and corresponding elements in function and operation.

The connection of the input line of OR gate G3 in the second embodiment is different from that in the first embodiment. In the second embodiment of FIG. 3, the input line of G3 is connected to the output of OR gate G12. The reason for this is that while in the first embodiment two terminal A and M of the third mode selection switch SW8 have been connected to a common line, the switch SW8' in the second embodiment is not of such connection for purpose of mode display. The second embodiment has three separate display units, one dot display unit 12 and two scale display units 11 and 13.

The dot display unit 12 is driven by a driver 8 by means of the output from A/D converter 5. The dot display unit may be formed of known display elements such as LED, liquid crystal or electrochromics. The unit 12 has a plural number of dot display parts regularly arranged in row. The dot display parts are selectively lighted n according to the input voltage of one of input terminals T1–T4 selected by the signal selection circuit 4 as described above.

The scale display unit 11 is that for display of aperture value and is driven by a scale display driver 9 when the output of gate G6 is "H". The other scale display unit 13 is that for display of shutter speed and is driven when the output of G6 is "L". During lighting of the scale display 12, the other display 13 remains off. During the lighting of the latter, the former remains off.

10 is a flickering circuit which produces the outputs of "H" and "L" alternately at a cyclic period in the order of about 4 Hz when the output of gate G10 is "H". A diaphragm priority mode indicator 16 is driven to flicker by this alternate output signal through gate G11. When the output of G10 is "L", the output of the flickering circuit 10 is fixed also at "L". Mode indicators 14, 15, 16 and 17 are of known type display unit formed of LED, liquid crystal or electrochromics. These mode indicators are selectively driven according to the mode selected by the mode selection switch SW8' thereby indicating the selected mode in character display or symbolic display. Of these four mode indicators 14 is for program mode, 15 for shutter priority mode, 16 for diaphragm priority mode and 17 for manual mode.

Figure 4:
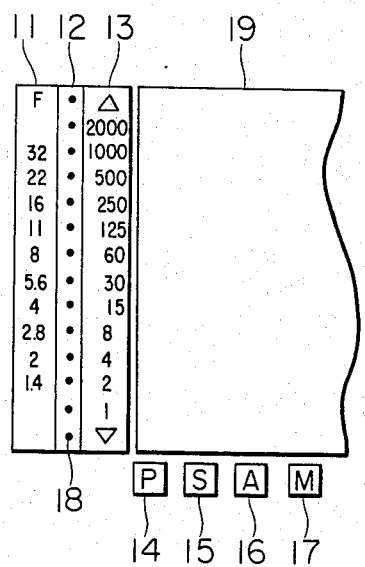
FIGS. 4 to 7 show examples of display appearing in the view-finder of the camera.

Displays made by the above display units and mode indicators usually appear in the view-finder of the camera. FIG. 4 shows an embodiment of the display arrangement. In FIG. 4, designated by 19 is a field frame defining the field of object to be taken. The above-mentioned dot display parts of the dot display unit 12 are designated by 18. The manner of display according to this arrangement will be described hereinafter in connection with FIGS. 5 to 7. Although the display latching switch SW9 shown in FIG. 1 is omitted from FIG. 3, it is to be understood that the display made in the second embodiment is also latched in the same manner as in the first embodiment during the time of the start of releasing to the completion of exposure.

The manner of display control in this second embodiment are as follows:

(1) For $AV0 < AVp < AVM$ in programmed exposure control mode:

In this case, like the above, the output of gate G4 is "H" and the output of G6 is "L". Therefore, TVp defined above is selected by the signal selection circuit 4 and a dot display is made at the dot position corresponding to Apex value of the selected signal. Since the output of G6 is "L", the shutter speed scale display unit 13 is driven so that the photographer can read the shutter speed at the position of the dot display. The program mode indicator 14 is also driven to indicate that the mode now selected is programmed exposure control mode.

On the other hand since the output of G9 is fixed at "L", the output of gate G4 is "H", the output of inverter INV1 is "L" and that of G8 is "L". Therefore, the output of the flickering circuit 10 is "L" and the mode indicator 16 is Off.

Figure 5:
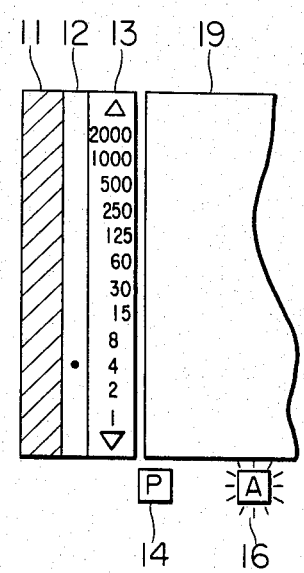

(2) For $AVp < AV0$ or $AVM < AVp$ in programmed exposure control mode:

In this case, the output of G4 is "L", the output of INV1 is "H" and the output of G10 is "H". Therefore, the flickering circuit 10 generates "H"-"L" alternate signal by which the diaphragm priority mode indicator 16 begins flickering. The program mode indicator 14 continues to operate. Since the output of G6 is fixed at "L", the shutter speed scale display unit is driven. In the manner described above, the selection circuit 4 selects any one signal of TVA0 and TVAM according to the occurring state and a dot display is made at the position corresponding to the selected signal. The state of $AVp < AV0$ or $AVM < AVp$ can be discriminated by the fact that the program mode indicator 14 is lighting in the fashion of direct current whereas the diaphragm priority mode indicator 16 is flickering as illustrated in FIG. 5.

(3) For $AV0 < AVs < AVM$ in shutter priority exposure control mode:

In this case, as previously described, the output of G5 is "H" and that of G6 is "H". Therefore, the circuit 4 selects AVs and there is made a dot display at the position corresponding to the aperture value of the selected signal. Because of the output of G6 being "H" the aperture value scale display unit 11 is driven this time. The photographer can read the determined aperture value at the position of the dot display. At the same time, the indicator 15 indicates that the selected mode is shutter priority exposure control mode.

Figure 6:
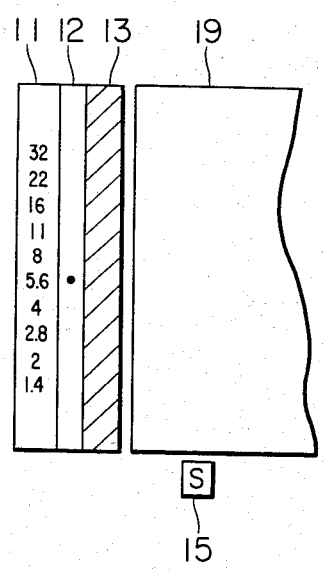

On the other hand, since the output of G8 is fixed at "L", the output of G5 is "H", that of INV2 is "L" and that of G9 is "L", the mode indicator 16 is Off. This state of display is illustrated in FIG. 6.

Figure 7:
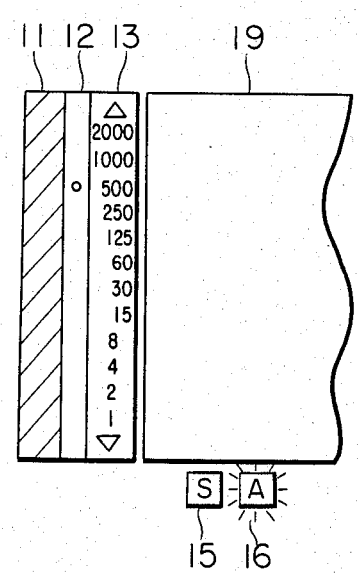

(4) For $AVs < AV0$ or $AVM < AVs$ in shutter priority exposure control mode:

In this case, the output of G5 is "L", and the outputs of INV2 and G9 are both "H". Therefore, the flickering circuit 10 flickers the diaphragm priority mode indicator 16 through gate G11. The shutter priority mode indicator 14 continues to operate. On the other hand, since the output of gate G6 is changed to "L", the scale display is changed over to shutter speed scale display. According to the selection output from the circuit 4 signal TVA0 or TVAM is selected and there is made a dot display at the position corresponding to the selected signal. The occurring state of $AVs < AV0$ or $AVM < AVs$ can be discriminated by the fact that the shutter priority mode indicator 15 is lighting in the fashion of direct current whereas the diaphragm priority mode indicator 16 is flickering at the time. This state of display is illustrated in FIG. 7.

(5) For diaphragm priority exposure control mode or manual shutter speed mode:

In this case, gates G8 and G9 are fixed at "L" to keep the flickering circuit 10 out of operation. The signal selection circuit 4 selects TVAM and a dot display is made at the position corresponding to it. According to the mode selected at the time, the shutter priority mode indicator 16 or manual mode indicator 17 operates to indicate the selected mode.

As readily understood from the foregoing, the present invention has eliminated the disadvantages of the prior art apparatus as previously described. With the camera according to the invention, the user can make a judgement always correctly and properly in taking a picture to catch good shutter chances without fail.

I claim:

1. In a display apparatus for use in a camera in which an aperture can be controlled within a predetermined control range based on an exposure time value preset to obtain an optimum exposure, the improvements comprising:
   (a) control means for setting the aperture to a determined aperture value and controlling an exposure time value based on said determined aperture value if an aperture value which can provide an optimum exposure based on said preset exposure time value is out of said determined control range;
   (b) detection means for determining whether or not said aperture value for optimum exposure is within said predetermined control range and generating a detection signal according to the result;
   (c) selection means for selectively generating either of two different signals according to said detection signal, one of which two different signals is an aperture signal indicative of said aperture value for optimum exposure and is generated when said aperture value for optimum exposure is within said determined range, and the other of which two different signals is a shutter speed signal indicative of said controlled exposure time value and is generated when said aperture value for optimum exposure is not within said range; and (d) display means for either displaying said aperture value for optimum exposure when said aperture signal is introduced thereto or displaying said controlled shutter speed value when said shutter speed signal is introduced thereto.

2. Apparatus according to claim 1, wherein said control means is able to control the aperture value in such manner that said determined aperture value is the maximum or minimum value in said determined control range.

3. Apparatus according to claim 2, wherein said detection means comprises:
   means for making a comparison between said aperture value for optimum exposure and said maximum aperture value and generating a first comparison signal and
   means for making a comparison between said aperture value for optimum exposure and said minimum aperture value and generating a second comparison signal.

4. Apparatus according to claim 3, wherein said selection means is able to generate said shutter speed signal in response to said first comparison signal and when said aperture value for optimum exposure has been found to be larger than said maximum aperture value, said shutter speed signal being indicative of the exposure time value for providing an optimum exposure at said maximum aperture value, and to generate said shutter speed signal in response to said second comparison signal and when said aperture value for optimum exposure has been found to be smaller than said minimum value, said shutter speed signal being indicative of the exposure time value for providing an optimum exposure at said minimum aperture value.

5. In a display apparatus for use in a camera in which an aperture can be controlled within a predetermined control range based on an exposure time value preset to obtain an optimum exposure, the improvements comprising:
   (a) control means for setting the aperture to a determined aperture value and controlling an exposure time value based on said determined aperture value if an aperture value which can provide an optimum exposure based on said preset exposure time value is out of said predetermined control range;
   (b) detection means for determining whether or not said aperture value for optimum exposure is within said predetermined control range and generating a detection signal when said aperture value for optimum exposure is outside said predetermined control range;
   (c) selection means for selectively generating either of two different signals according to said detection signal, one of which two different signals is an aperture signal indicative of said aperture value for optimum exposure and is generated when said detection signal is absent, and the other of which two different signals is a shutter speed signal indicative of said controlled exposure time value and is generated in response to said detection signal; and
   (d) display means for displaying, in response to said detection signal, either one of an aperture value indicated by said aperture signal or a controlled shutter time value indicated by said shutter speed signal.

* * * * *

UNITED STATES PATENT AND TRADEMARK OFFICE
CERTIFICATE OF CORRECTION

PATENT NO. : 4,527,882

DATED : July 9, 1985

INVENTOR(S) : OSAMU MAIDA

It is certified that error appears in the above-identified patent and that said Letters Patent is hereby corrected as shown below:

In the Headnote:

Item [56], References cited,

Please insert as follows:

--4,286,849  9/1981  Uchidoi et al.........354/38;

4,104,655  8/1978  Strauss ..............354/38--.

Column 2, line 26, change "AE" to --EA--.

Column 5, line 46, after "mode" insert --:--.

Column 6, line 7, change "15" to --I5--.

Column 8, line 39, move "For AVp < AV0:" to the next line.

Column 10, line 3, change AVO" to --AV0--;

lines 8 and 9, change "AVO" to --AV0-- (Both occurrences;

line 42, after "AV0 < AVp < AVM" insert --:--;

line 65, after "AVp < AV0" insert --:--.

UNITED STATES PATENT AND TRADEMARK OFFICE
CERTIFICATE OF CORRECTION

PATENT NO. : 4,527,882  
DATED : July 9, 1985  
INVENTOR(S) : OSAMU MAIDA

Page 2 of 2

It is certified that error appears in the above-identified patent and that said Letters Patent is hereby corrected as shown below:

```
Column 11, line 11, change "VTVAO" to --VTVA0--;
           line 16, after "AVp < AVM" insert --:--;
           line 60, change "AVS" to --AVs--.
Column 12, line 9, change "AVs < AV0" to --AVS < AV0:--
           line 21, change "AVM < AVs" to --AVM < AVs:--
           line 33, after "AV0 < AVs < AVM" insert --:--.
Column 13, line 1, change "AVs < AV0" to --AVs < AV0:--
           line 21, after "AVM < AVs" insert --:--;
           line 39, after "mode" insert --:--.
Column 14, line 1, after "mode" insert --:--;
           line 52, after "lighted" delete "n".
Column 15, line 38, after "hand" insert --,--.
```

Signed and Sealed this

Nineteenth Day of November 1985

[SEAL]

Attest:

DONALD J. QUIGG

Attesting Officer

Commissioner of Patents and Trademarks